(12) United States Patent
Chu et al.

(10) Patent No.: US 9,038,702 B2
(45) Date of Patent: *May 26, 2015

(54) SYSTEM AND METHOD OF PRODUCING MULTI-LAYERED ALLOY PRODUCTS

(71) Applicant: Alcoa Inc., Pittsburgh, PA (US)

(72) Inventors: Men G. Chu, Export, PA (US); Jeffrey J. Shaw, Lower Burrell, PA (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/971,101

(22) Filed: Aug. 20, 2013

(65) Prior Publication Data

US 2013/0337177 A1 Dec. 19, 2013

Related U.S. Application Data

(63) Continuation of application No. 12/415,001, filed on Mar. 31, 2009, now Pat. No. 8,534,344.

(51) Int. Cl.
*B22D 7/02* (2006.01)
*B22D 19/00* (2006.01)
(Continued)

(52) U.S. Cl.
CPC ........... *B05D 1/36* (2013.01); *Y10T 428/12639* (2015.01); *B22D 7/02* (2013.01); *B22D 7/06* (2013.01); *B22D 7/064* (2013.01); *B22D 11/007* (2013.01); *B22D 11/0631* (2013.01); *B23K 20/04* (2013.01); *B23K 20/2336* (2013.01); *B23K 20/24* (2013.01); *B23K 2201/18* (2013.01); *B23K 2203/10* (2013.01);
(Continued)

(58) Field of Classification Search
CPC ............ B22D 7/02; B22D 7/06; B22D 7/064; B22D 11/007; B22D 19/00; B22D 19/02; B22D 19/04; B22D 19/16
USPC ......................... 164/94, 95, 96, 100, 103, 461
See application file for complete search history.

(56) References Cited

U.S. PATENT DOCUMENTS 2,301,902 A 11/1942 Merle
3,206,808 A 9/1965 Robinson
(Continued)

FOREIGN PATENT DOCUMENTS

EP 0149063 7/1985
EP 1118457 7/2001
(Continued)

OTHER PUBLICATIONS

International Search Report from PCT/US10/28283 mailed May 12, 2010.
(Continued)

*Primary Examiner* — Kevin P Kearns
(74) *Attorney, Agent, or Firm* — Greenberg Traurig, LLP

(57) ABSTRACT

System and method of producing multi-layered aluminum alloy products are disclosed. A multi-layered aluminum alloy product may be formed by first heating a first aluminum alloy to a first temperature where the first temperature is at least about 5° C. lower than the eutectic temperature of the first aluminum alloy, second heating a second aluminum alloy to a second temperature where the second temperature is at least about 5° C. higher than the liquidus temperature of the second aluminum alloy, and coupling the second aluminum alloy to the first aluminum alloy to produce a multi-layered aluminum alloy product.

7 Claims, 6 Drawing Sheets

(51) Int. Cl.

| | |
|---|---|
| *B05D 1/36* | (2006.01) |
| *B22D 7/06* | (2006.01) |
| *B22D 11/00* | (2006.01) |
| *B22D 11/06* | (2006.01) |
| *B23K 20/04* | (2006.01) |
| *B23K 20/233* | (2006.01) |
| *B23K 20/24* | (2006.01) |
| *B32B 15/01* | (2006.01) |
| *C22F 1/04* | (2006.01) |
| *B05D 3/02* | (2006.01) |
| *B05D 3/10* | (2006.01) |
| *B22D 25/00* | (2006.01) |

(52) U.S. Cl.
CPC .......... *B23K 2203/18* (2013.01); *B32B 15/016* (2013.01); *C22F 1/04* (2013.01); *B05D 3/0218* (2013.01); *B05D 3/102* (2013.01); *B22D 25/00* (2013.01); *B05D 3/10* (2013.01); *B22D 19/00* (2013.01)

(56) References Cited

U.S. PATENT DOCUMENTS

| | | | |
|---|---|---|---|
| 3,754,318 | A | 8/1973 | Trost |
| 4,202,709 | A | 5/1980 | Shimbamori et al. |
| 4,567,936 | A | 2/1986 | Binczewski |
| 4,643,241 | A | 2/1987 | Yonekura et al. |
| 5,066,546 | A | 11/1991 | Materkowski |
| 5,232,041 | A | 8/1993 | Kuhn |
| 5,337,801 | A | 8/1994 | Materkowski |
| 5,476,725 | A | 12/1995 | Papich et al. |
| 6,495,269 | B1 | 12/2002 | Haszler et al. |
| 7,040,376 | B2 | 5/2006 | Nakao et al. |
| 7,066,235 | B2 | 6/2006 | Huang |
| 8,534,344 | B2 * | 9/2013 | Chu et al. ........................ 164/94 |
| 2003/0079856 | A1 | 5/2003 | Kilmer et al. |
| 2003/0165709 | A1 | 9/2003 | Gazapo et al. |
| 2005/0011630 | A1 | 1/2005 | Anderson et al. |
| 2006/0185816 | A1 | 8/2006 | Anderson et al. |
| 2007/0012417 | A1 * | 1/2007 | Chu et al. .................. 164/122.1 |
| 2008/0182122 | A1 | 7/2008 | Chu et al. |
| 2008/0274367 | A1 | 11/2008 | Kilmer et al. |
| 2010/0247954 | A1 | 9/2010 | Chu et al. |

FOREIGN PATENT DOCUMENTS

| | | |
|---|---|---|
| JP | 59030464 | 2/1984 |
| JP | 59030465 | 2/1984 |
| JP | 404009261 | 1/1992 |

OTHER PUBLICATIONS

Cast Bonding Australia, "Cast Bonding Australia takes the lead in cost effective problem solving in abrasion/corrosion resistance", press release.

Hashimoto, M., "Development of high-Toughness Roll by CPC Process", Nippon Steel Technical Report, Issue 48, Jan. 1991, pp. 71-76.

Kura, J.G., "Cast bonding produces quality metallic composites", Materials Engineering, 1984, pp. 60-61.

Lukashkin, N.D. et al., "Structure and Properties of Aluminum Joints Subject to Foundry Cladding", Metal Science and Heat Treatment, vol. 27, issue 1, 1985, pp. 75-77 (English Translation from Mettalovedenie I Termicheskaya Obrabotka Metallov, No. 1, pp. 55-56, Jan. 1985).

Shastry, C.R., "Corrosion of Metalic Coated Sheets", ASM Handbook, vol. 13B, 2005, pp. 35-39.

Stergioudis, G., "Homogenization process of the intermetallic compound layers of Al-clad iron", Journal of Alloys and Compounds, vol. 403, issue 1-2, Nov. 2005, pp. 143-146.

Sukonnik, I., "Clad Metal Technology in the USSR", Journal of Metals, vol. 38, issue 11, Nov. 1986, pp. 44-46.

Gabe, D.R., "Metal Alloy Coatings for Protection", Industrial Corrosion, vol. 1, issue 6, Sep. 1983, pp. 10-13.

* cited by examiner

SYSTEM AND METHOD OF PRODUCING MULTI-LAYERED ALLOY PRODUCTS

RELATED APPLICATIONS

This application is a continuation of U.S. patent application Ser. No. 12/415,001, filed on Mar. 31, 2009, has since issued as U.S. Pat. No. 8,534,344 on Sep. 17, 2013, the entirety of which is hereby incorporated herein by reference in its entirety for all purposes.

BACKGROUND

Clad sheets including brazing sheets and aerospace skin sheet are used in applications where it may be necessary to have surface properties different from that of the core. To date, clad sheets may be produced by roll bonding a liner layer to a core ingot. Roll bonding requires, in some instances, at least one of casting, scalping, rolling, trimming and mechanically attaching a liner material to a core material. The quality of the bonding, productivity of the process, and cost associated with scraps remain challenging for roll bonding.

SUMMARY

System and method of producing multi-layered aluminum alloy products are disclosed. A first aluminum alloy may be produced and first heated to a first temperature, which may be at least about 5° C. lower than the eutectic temperature of the first aluminum alloy. A second aluminum alloy may be produced and second heated to a second temperature, which may be at least about 5° C. higher than the liquidus temperature of the second aluminum alloy. The second aluminum alloy may be placed in contact with the first aluminum alloy to produce a multi-layered aluminum alloy product. In one embodiment, the first heating step, the second heating step, and the placing step may occur concomitantly. In some embodiments, the first heating step is concomitant to the second heating step and the placing step is concomitant to at least one of the first heating step and the second heating step.

In one embodiment, the first aluminum alloy may be scalped before the first heating step. In one embodiment, a flux may be applied to a surface of the first aluminum alloy before the placing step. In one example, applying the flux comprises brushing a salt-based compound onto the surface of the first aluminum alloy. In some embodiments, the first aluminum alloy may be produced by direct chill ingot casting, permanent mold casting, slab casting and plate casting and the second aluminum alloy may be produced by melting and alloying.

In one embodiment, the second aluminum alloy may be placed in contact with the first aluminum alloy by moving the first aluminum alloy in a first direction, positioning the second aluminum alloy substantially adjacent to the first aluminum alloy, and delivering the second aluminum alloy over a surface of the first aluminum alloy.

In one embodiment, the first multi-layered aluminum alloy product may be heated to a third temperature, which may be about 1° C. lower than the lesser of the eutectic temperatures of the first and second aluminum alloys. A third aluminum alloy may be produced and heated to a fourth temperature, which is at least about 5° C. higher than the liquidus temperature of the third aluminum alloy. The third aluminum alloy may be placed in contact with the first multi-layered aluminum alloy product to produce a second multi-layered aluminum alloy.

In one embodiment, the third heating step, the fourth heating step, and the second placing step may occur concomitantly. In some embodiments, the third heating step is concomitant to the fourth heating step and the second placing step is concomitant to at least one of the third heating step and the fourth heating step.

One multi-layered aluminum alloy product may be produced by a first aluminum alloy coupled to a second aluminum alloy, the coupling by first heating the first aluminum alloy to a first temperature, which may be at least about 5° C. lower than the eutectic temperature of the first aluminum alloy. Second, heating the second aluminum alloy to a second temperature, which may be at least about 5° C. higher than the liquidus temperature of the second aluminum alloy. Next, contacting the second aluminum alloy to the first aluminum alloy to produce the multi-layered aluminum alloy product. In one embodiment, a flux may be applied to a surface of the first aluminum alloy before the contacting step. For example, the flux may be a salt-based compound.

Another multi-layered aluminum alloy product may be produced by a first aluminum alloy coupled to a second aluminum alloy coupled to a third aluminum alloy. The coupling may occur by first, heating the first aluminum alloy to a first temperature, which may be at least about 5° C. lower than the eutectic temperature of the first aluminum alloy. Next, heating the second aluminum alloy to a second temperature, which may be at least about 5° C. higher than the liquidus temperature of the second aluminum alloy. Next, contacting the second aluminum alloy to the first aluminum alloy. The coupled first and second aluminum alloys may be heated to a third temperature, which may be at least about 1° C. lower than the lesser of the eutectic temperatures of the first and second aluminum alloys. Next, a third aluminum alloy may be coupled to the second aluminum alloy or the first aluminum alloy by heating the third aluminum alloy to a fourth temperature, which may be at least about 5° C. higher than the liquidus temperature of the third aluminum alloy, and contacting the third aluminum alloy to the second aluminum alloy or the first aluminum alloy.

In one embodiment, the first aluminum alloy may be scalped before being heated to the first temperature and the second aluminum alloy may be scalped before the first and second aluminum alloys are heated to the third temperature. In some embodiments, a first flux may be applied to a surface of the first aluminum alloy before the second aluminum alloy is placed in contact with the first aluminum alloy, and a second flux may be applied to a surface of the second aluminum alloy before the third aluminum alloy is placed in contact with the second aluminum alloy. In these examples, the first flux and the second flux may be salt-based compounds.

Other variations, embodiments and features of the presently disclosed system and method of producing multi-layered aluminum alloy products will become evident from the following detailed description, drawings and claims.

DETAILED DESCRIPTION

It will be appreciated by those of ordinary skill in the art that the system and method of producing multi-layered aluminum alloy products can be embodied in other specific forms without departing from the spirit or essential character thereof. The presently disclosed embodiments are therefore considered in all respects to be illustrative and not restrictive.

Figure 1:
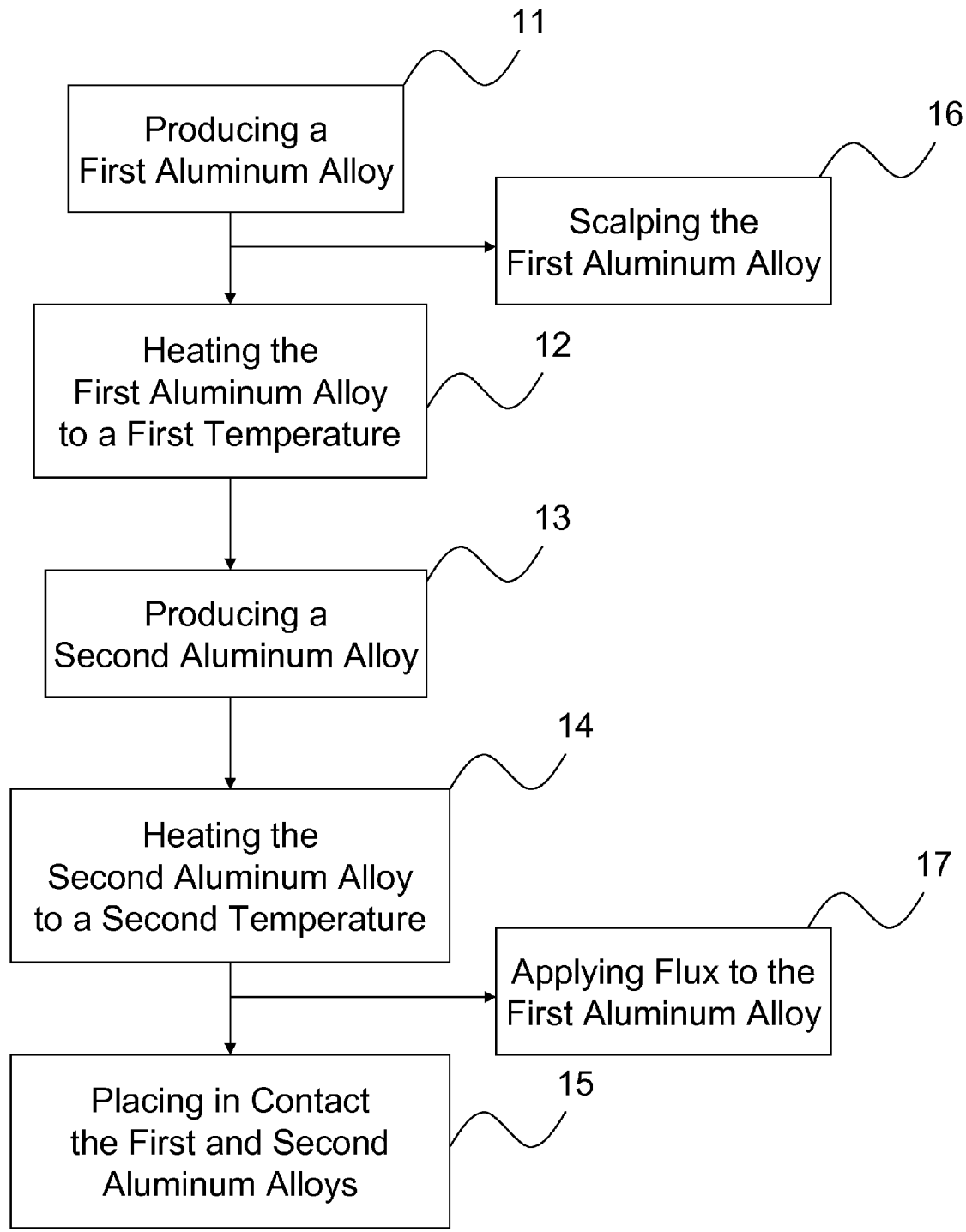
FIG. 1 is a block diagram of one method of producing a multi-layered aluminum alloy product according to one embodiment of the present disclosure.

FIG. 1 is a block diagram of one method of producing a mufti-layered aluminum alloy product according to one embodiment of the present disclosure. A first aluminum alloy may be produced 11. As used herein, "aluminum alloy" and the like means a mixture containing one or more metallic elements or metallic and nonmetallic elements of aluminum, including copper, zinc, manganese, silicon and magnesium, to name a few. For example, an aluminum alloy may include ASTM standard aluminum alloy from 1xxx, 2xxx, 3xxx, 4xxx, 5xxx, 6xxx, 7xxx and 8xxx series.

In one embodiment, the first aluminum alloy produced 11 may be heated to a first temperature 12. In one embodiment, the first temperature is at least about 5° C. lower than the eutectic temperature of the first aluminum alloy. As used herein, "eutectic temperature" is the temperature at which an aluminum alloy completely solidifies during cooling from its liquid state. For example, the eutectic temperature of a 3003 aluminum alloy is at about 634° C. An aluminum alloy maintained below its eutectic temperature will have a substantially solid component, while an aluminum alloy maintained above its eutectic temperature before reaching its liquid state will have a mixture of solid and liquid component. In some embodiments, the first temperature may be at least about 1° C. lower, or about 2° C. lower, or about 3° C. lower, or about 7° C. lower, or about 10° C. lower, than the eutectic temperature of the first aluminum alloy. In some embodiments, the first temperature may not be greater than about 200° C. lower, or about 300° C. lower, or about 500° C. lower than the eutectic temperature of the first aluminum alloy.

In one embodiment, a second aluminum alloy may be produced 13. Like above, the second aluminum alloy produced 13 may be any aluminum alloy including ASTM standard aluminum alloy from 1xxx, 2xxx, 3xxx, 4xxx, 5xxx, 6xxx, 7xxx and 8xxx series. The second aluminum alloy produced 13 may be heated to a second temperature 14. In one embodiment, the second temperature is at least about 5° C. higher than the liquidus temperature of the second aluminum alloy. As used herein, "liquidus temperature" is the temperature at which an aluminum alloy begins to solidify during cooling from its liquid state. For example, the liquidus temperature of a 3003 aluminum alloy is at about 655° C. An aluminum alloy maintained above its liquidus temperature will have a substantially liquid component, while an aluminum alloy maintained below its liquidus temperature before complete solidification will have a mixture of solid and liquid component. In some embodiments, the second temperature may be at least about 1° C. higher, or about 2° C. higher, or about 3° C. higher, or about 7° C. higher, or about 10° C. higher, than the liquidus temperature of the second aluminum alloy. In some embodiments, the second temperature may not be greater than about 200° C. higher, or about 300° C. higher, or about 500° C. higher than the liquidus temperature of the second aluminum alloy.

The first and second aluminum alloys may be placed in contact 15. In one embodiment, the placing in contact produces a first multi-layered aluminum alloy product 21 (see FIG. 2). As used herein, "contact" and the like means the act of physical touching. For example, a second aluminum alloy may be cast, delivered or otherwise be placed in physical contact (e.g., poured or spread onto) with a first aluminum alloy. In one example, a second aluminum alloy may be delivered over a surface of a first aluminum alloy by a metal delivery system. "Multi-layered" and the like means having more than one layer of material. In one example, a multi-layered product may have a first layer and a second layer, the first layer being associated with a first aluminum alloy (e.g., AA 3003) and a second layer being associated with a second aluminum alloy (e.g., AA 4343). In one example, the first layer may be associated with a first aluminum alloy (e.g., AA 2024) and the second layer may be associated with a second aluminum alloy (e.g., AA 1050).

In one embodiment, the first aluminum alloy may be scalped 16 before being heated to a first temperature 12. As used herein, "scalping" and like means a process to remove any undesirable surface defects present on an aluminum alloy surface. For example, oxide skims, residual lubricants, surface cracks, and liquations may be removed from an as-cast aluminum ingot surface using a milling machine or fly cutter.

In one embodiment, a flux may be applied 17 to the first aluminum alloy before the first and second aluminum alloys are placed in contact 15. As used herein, "flux" and the like means a salt-based compound used to remove any oxide from on the surface of an aluminum alloy. For example, a brazing salt may be brushed on the surface of a scalped metal ingot during preheat.

In one embodiment, the first aluminum alloy may be produced 11 by direct chill ingot casting. As used herein, "producing" and the like means any conventional method of producing a solid or nearly solid aluminum alloy. "Direct chill ingot casting" and the like means a manufacturing process by which a liquid metal flows into a water-cooled mold, which is initially closed by a bottom block on a movable platen. The metal freezes against the bottom block and forms a shell on the mold surface. The platen is then steadily withdrawn, pulling the solidifying shell with it. As the shell exits the bottom of the mold, cold water may be sprayed directly on the shell for cooling purposes. In some embodiments, the first aluminum alloy may be produced 11 by continuous casting including slab casting and plate casting, to name a few.

In one embodiment, the first aluminum alloy may be produced 11 by permanent mold casting. As used herein, "permanent mold casting" and the like means a manufacturing process in which liquid material may be delivered (e.g., poured or spread onto) into a metallic mold, which contains a hollow cavity of the desired shape, and then allowed to solidify.

In one embodiment, the second aluminum alloy may be produced 13 by melting and alloying. As used herein, "melting" and the like means to change a material from a solid phase to a liquid phase. For example, a 4343 aluminum alloy may be melted in preparation for being placed in contact with a 3003 aluminum alloy. "Alloying" and the like means mixing of one or more metals to form an alloy. For instance, chemical elements necessary for forming a 4343 aluminum alloy may be alloyed in preparation for being placed in contact with a 3003 aluminum alloy.

Figure 2:
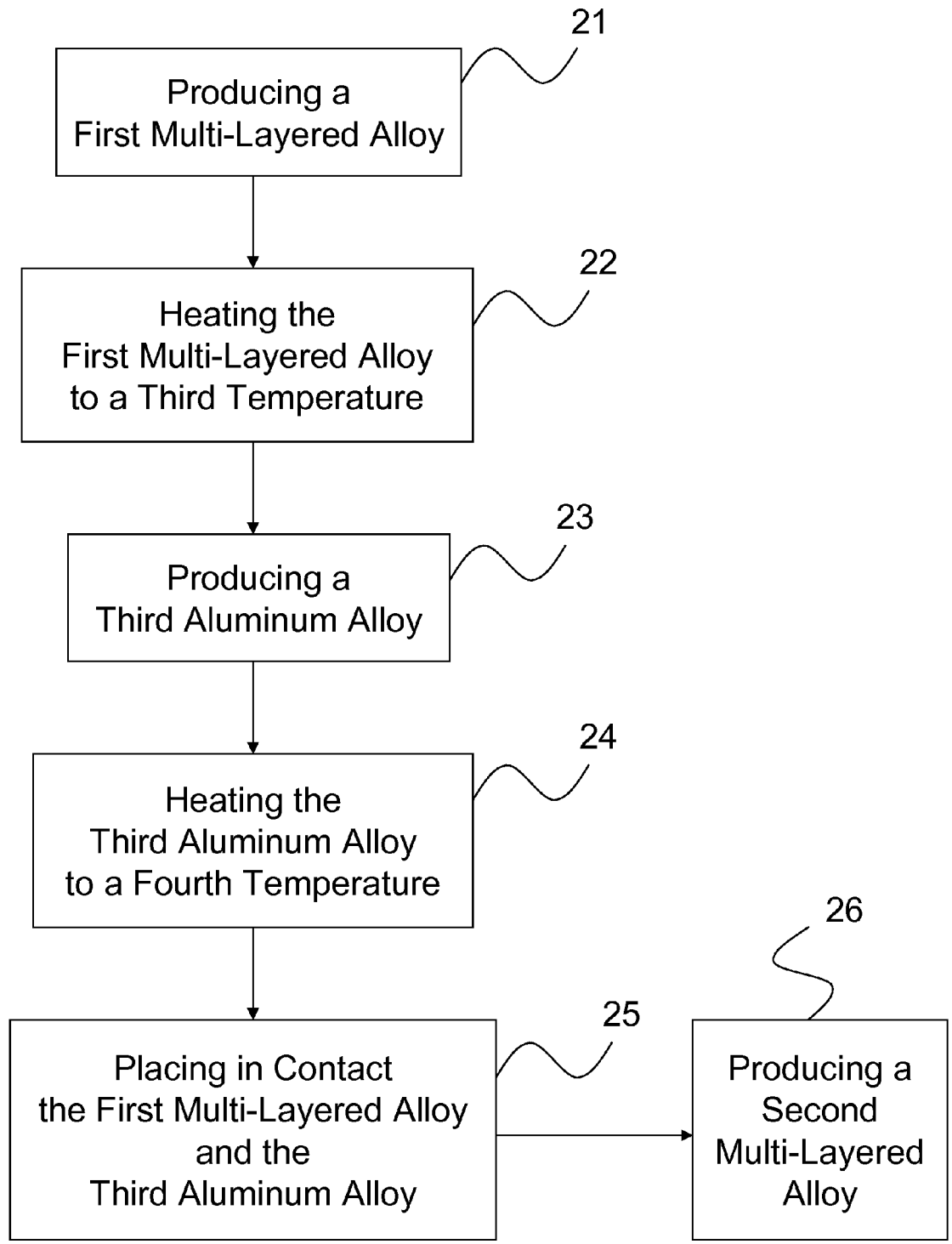
FIG. 2 is a block diagram of one method of producing a multi-layered aluminum alloy product according to one embodiment of the present disclosure.

FIG. 2 is a block diagram of one method of producing, a multi-layered product according to one embodiment of the present disclosure. In one embodiment, the method comprises producing a first multi-layered aluminum alloy 21. In one example, the first multi-layered aluminum alloy may be produced 21 by placing a second aluminum alloy in contact with the first aluminum alloy 15 using a substantially similar process as that shown above. In some embodiments, the first multi-layered aluminum alloy may be produced 21 by other techniques including roll bonding and other mechanical bonding methods. The first multi-layered aluminum alloy may be heated to a third temperature 22. In one embodiment, the third temperature is at least about 1° C. lower than the lesser of the eutectic temperatures of the first and second aluminum alloys. In some embodiments, the third temperature may be at least about 2° C. lower, or about 3° C. lower, or about 4° C. lower, or about 5° C. lower, or about 7° C. lower, or about 10° C. lower, than the lesser of the eutectic temperatures of the first and second aluminum alloys. In some embodiments, the third temperature may not be greater than about 200° C. lower, or about 300° C. lower, or about 500° C. lower, than the lesser of the eutectic temperatures of the first and second aluminum alloys.

In one embodiment, a third aluminum alloy may be produced 23. Like above, the third aluminum alloy may be any aluminum alloy including ASTM standard aluminum alloy from 1xxx, 2xxx, 3xxx, 4xxx, 5xxx, 6xxx, 7xxx and 8xxx series. The third aluminum alloy may be heated to a fourth temperature 24. In one embodiment, the fourth temperature is at least about 5° C. higher than the liquidus temperature of the third aluminum alloy. In some embodiments, the fourth temperature may be at least about 1° C. higher, or about 2° C. higher, or about 3° C. higher, or about 7° C. higher, or about 10° C. higher, than the liquidus temperature of the third aluminum alloy. In some embodiments, the fourth temperature may not be greater than about 200° C. higher, or about 300° C. higher, or about 500° C. higher than the liquidus temperature of the third aluminum alloy.

The first multi-layered aluminum alloy and the third aluminum alloy may be placed in contact 25. In one embodiment, the placing in contact produces a second multi-layered aluminum alloy product 26. For example, the second multi-layered product produced 26 may have first, second and third layers. The first layer may be coupled to the second layer and the second layer may be coupled to the third layer. The first and third layers may be associated with first and third aluminum alloys (e.g., AA 1050), respectively, and the second layer may be associated with a second aluminum alloy (e.g., AA 2024). In one embodiment, the first and third layers may be associated with first and third aluminum alloys (e.g., AA 4343), and the second layer may be associated with a second aluminum alloy (e.g., AA 3003). In one embodiment, the first multi-layered aluminum alloy may be scalped (not shown) before being heated to a third temperature 22. In one embodiment, a flux may be applied to the first multi-layered aluminum alloy before the first multi-layered aluminum alloy and the third aluminum alloy are placed in contact 25.

In one embodiment, the steps as shown in FIG. 1 may be combined with the steps as shown in FIG. 2 to produce a multi-layered aluminum alloy product comprising at least three layers. In some embodiments, the method may consist of one or more of the steps described above.

Figure 3:
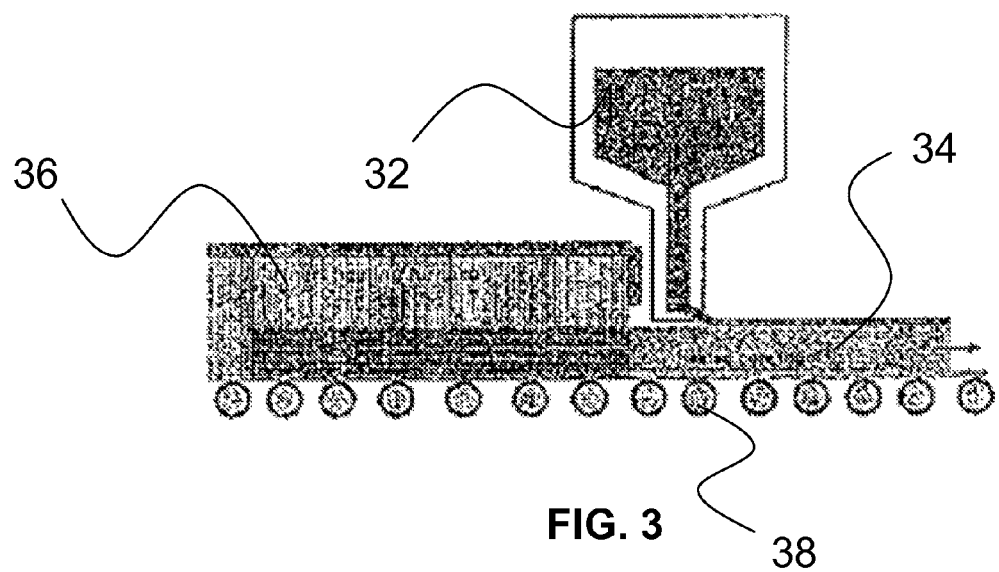
FIG. 3 is an illustration of one cast bonding process according to one embodiment of the present disclosure.

FIG. 3 illustrates one cast bonding process according to one embodiment of the present disclosure. In this embodiment, a layer of liquid metal 32 may be cast onto a solid ingot 34 to produce a multi-layered aluminum alloy product. In one instance, the liquid metal 32 and the solid ingot 34 may be substantially adjacent to one another to facilitate placing the two in physical contact with one another. In one embodiment, the solid ingot 34 may be produced from an inert heating furnace 36 and transported along a moving carrier 38. As shown, the solid ingot 34 is moving in one direction (e.g., to the right) while a liquid metal 32 is being delivered over a surface (e.g., top surface) of the solid ingot 34. In other words, the first aluminum alloy 34 may be in motion while the second aluminum alloy 32 may be substantially stationary. In one instance, to better control the temperature of the second aluminum alloy 32 to be at least about 5° C. higher than the liquidus temperature of the second aluminum alloy 32. In one example, the solid ingot 34 may be heated as it moves along the moving carrier 38.

Figure 4A:
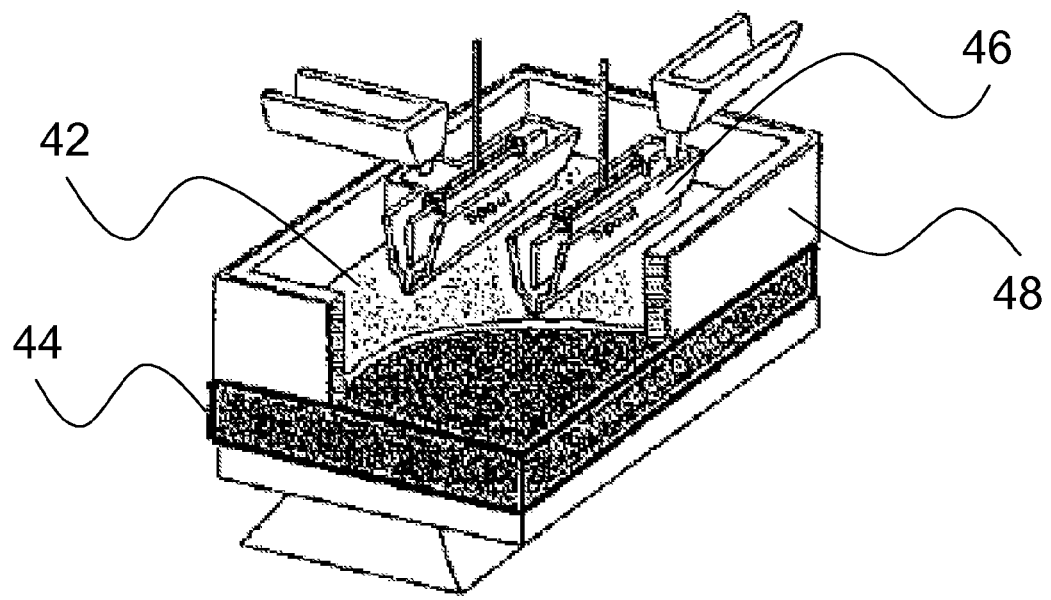
FIGS. 4A-4B are illustrations of two cast bonding processes according to two embodiments of the present disclosure.
Figure 4B:
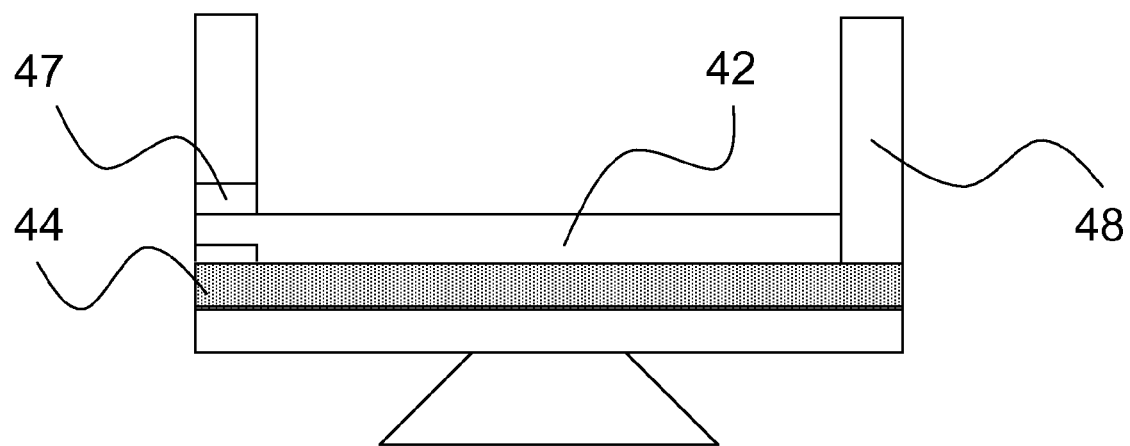

FIGS. 4A-4B illustrate two cast bonding processes according to two embodiments of the present disclosure. In one embodiment (FIG. 4A), a layer of liquid metal 42 may be cast onto a solid ingot 44 to produce a multi-layered aluminum alloy product in a bi-level metal transfer process. In one embodiment, the liquid metal 42 may be cast through a metal distribution trough and spout 46 substantially situated above a top surface of the solid ingot 44. In one instance, the first aluminum alloy 44 may be substantially stationary while the second aluminum alloy 42 is delivered to a top surface of the first aluminum alloy 44. In one example, the delivery of the second aluminum alloy 42 may be rapid enough to ensure that the temperature of the second aluminum alloy 42 continues to be maintained at least about 5° C. higher than the liquidus temperature of the second aluminum alloy 42. In one embodiment, the solid ingot 44 may be heated to a desired temperature. In one embodiment, the casting process of the liquid metal 42 onto the solid ingot 44 may be facilitated by a refractory wall 48, which contains a hollow cavity of the desired shape. In this embodiment, the refractory wall 48 is rectangular in shape. In some embodiments, the refractory wall 48 may take on other polygonal shapes and sizes. In one embodiment, the liquid metal 42 cast onto the solid ingot 44 may be allowed to solidify to produce the multi-layered aluminum alloy product.

In one embodiment (FIG. 4B), a metal delivery system may include a horizontal distribution spout 47 disposed about a side of the refractory wall 48 in a level pouring metal transfer process. In one embodiment, the second aluminum alloy 42 may be horizontally delivered on the top surface of the first aluminum alloy 44 from the distribution spout 47 disposed about a side of the refractory wall 48.

In one embodiment, the refractory walls 48 are sitting on an upper surface of the first aluminum alloy 44 (as shown in FIGS. 4A-4B). In some embodiments, the refractory walls 48 may be aligned against the sides of the first aluminum alloy 44 (not shown). In other words, the walls 48 may surround an outer surface of the first aluminum alloy 44.

Figure 5:
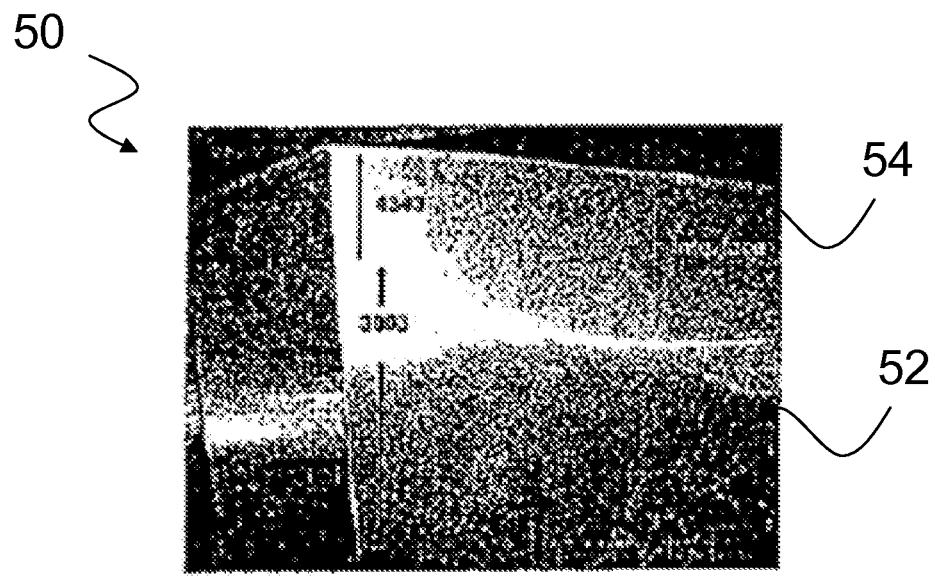
FIGS. 5-6 illustrate perspective views of one example of a multi-layered aluminum alloy product manufactured according to one embodiment of the present disclosure.
Figure 6:
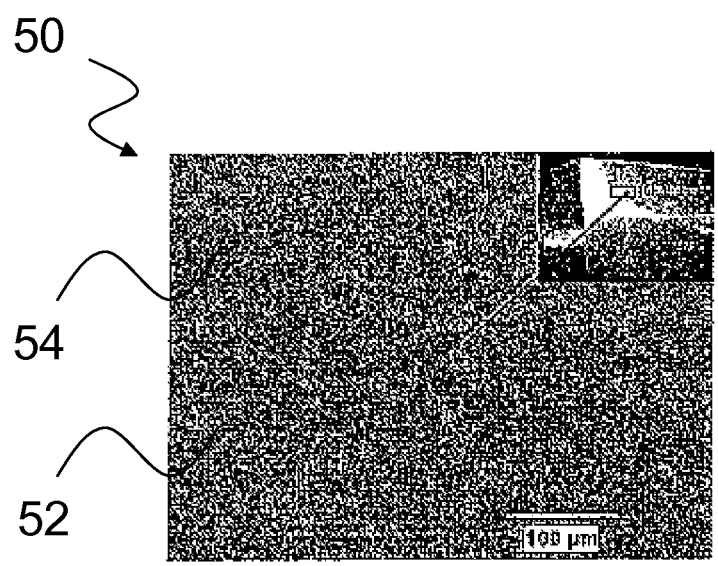

FIGS. 5-6 are perspective views of one example of a multi-layered product 50 as manufactured according to one embodiment of the present disclosure. In one embodiment, the multi-layered product 50 includes a first aluminum alloy 52 coupled to a second aluminum alloy 54. The coupling may be accomplished by heating the first aluminum alloy 52 to a first temperature, heating the second aluminum alloy 54 to a second temperature, and contacting the second aluminum alloy 54 to the first aluminum alloy 52. In one embodiment, the first aluminum alloy 52 of the multi-layered product 50 is a 3003 aluminum alloy and the second aluminum alloy 54 of the multi-layered product 50 is a 4343 aluminum alloy.

In one embodiment, the first temperature is at least about 5° C. lower than the eutectic temperature of the first aluminum alloy 52. In some embodiments, the first temperature may be at least about 1° C. lower, or about 2° C. lower, or—about 7° C. lower, or about 10° C. lower, than the eutectic temperature of the first aluminum alloy. In one embodiment, the second temperature may be at least about 5° C. higher than the liquidus temperature of the second aluminum alloy 54. In some embodiments, the second temperature may be at least about 1° C. higher, or about 2° C. higher, or about 3° C. higher, or about 7° C. higher, or about 10° C. higher, than the liquidus temperature of the second aluminum alloy 54. In some embodiments, the first temperature may not be greater than about 200° C. lower, or about 300° C. lower, or about 500° C. lower than the eutectic temperature of the first aluminum alloy and the second temperature may not be greater than about 200° C. higher, or about 300° C. higher, or about 500° C. higher than the liquidus temperature of the second aluminum alloy.

In one embodiment, the first aluminum alloy 52 may be scalped before being heated to the first temperature. In one embodiment, a flux may be applied to the surface of the first aluminum alloy 52 before the two aluminum alloys 52, 54 are brought into contact.

In one embodiment, a third aluminum alloy (not shown) may be coupled to the multi-layered product 50 to produce a second multi-layered product (not shown). In one embodiment, the multi-layered product 50 comprises the first aluminum alloy 52 and the second aluminum alloy 54. In one instance, the coupling may be accomplished by first heating the multi-layered product 50 to a third temperature. The third temperature may be at least about 1° C. lower than the lesser of the eutectic temperatures of the first and second aluminum alloys 52, 54. In some embodiments, the third temperature may be at least about 2° C. lower, or about 3° C. lower, or about 4° C. lower, or about 5° C. lower, or about 7° C. lower, or about 10° C. lower, than the lesser of the eutectic temperatures of the first and second aluminum alloys 52, 54. In some embodiments, the third temperature may not be greater than about 200° C. lower, or about 300° C. lower, or about 500° C. lower, than the lesser of the eutectic temperatures of the first and second aluminum alloys 52, 54.

In one embodiment, the third aluminum alloy may be heated to a fourth temperature before being placed in contact with the multi-layered product 50 in forming a second multi-layered product. In one embodiment, the fourth temperature is at least about 5° C. higher than the liquidus temperature of the third aluminum alloy. In some embodiments, the fourth temperature may be at least about 1° C. higher, or about 2° C. higher, or about 3° C. higher, or about 7° C. higher, or about 10° C. higher, than the liquidus temperature of the third aluminum alloy. In some embodiments, the fourth temperature may not be greater than about 200° C. higher, or about 300° C. higher, or about 500° C. higher than the liquidus temperature of the third aluminum alloy.

FIG. 6 is a perspective, close-up view of the multi-layered product 50. In one embodiment, a 3003 aluminum alloy core material may first be heated to about 730° F., and maintained at that temperature throughout a casting process. A layer of liquid 4343 aluminum alloy liner material may be placed in contact with a surface of the 3003 aluminum alloy layer using at least one of the steps shown in FIGS. 3-4. In some embodiments, the liquid 4343 aluminum alloy liner material may be cast onto the 3003 aluminum alloy layer using one of the bonding processes discussed above. As shown by the perspective, close-up view of FIG. 6, the cast bonding process is able to provide a substantially continuous interface between the two layers. In cast bonding, a liquid material may be placed in contact with a solid metal. The liquid material may generate a local remelting of the contacted surface of the solid metal. Consequently, the local remelting is able to yield a metallurgical bond between the two materials by liquid-solid phase transformation.

Figure 7:
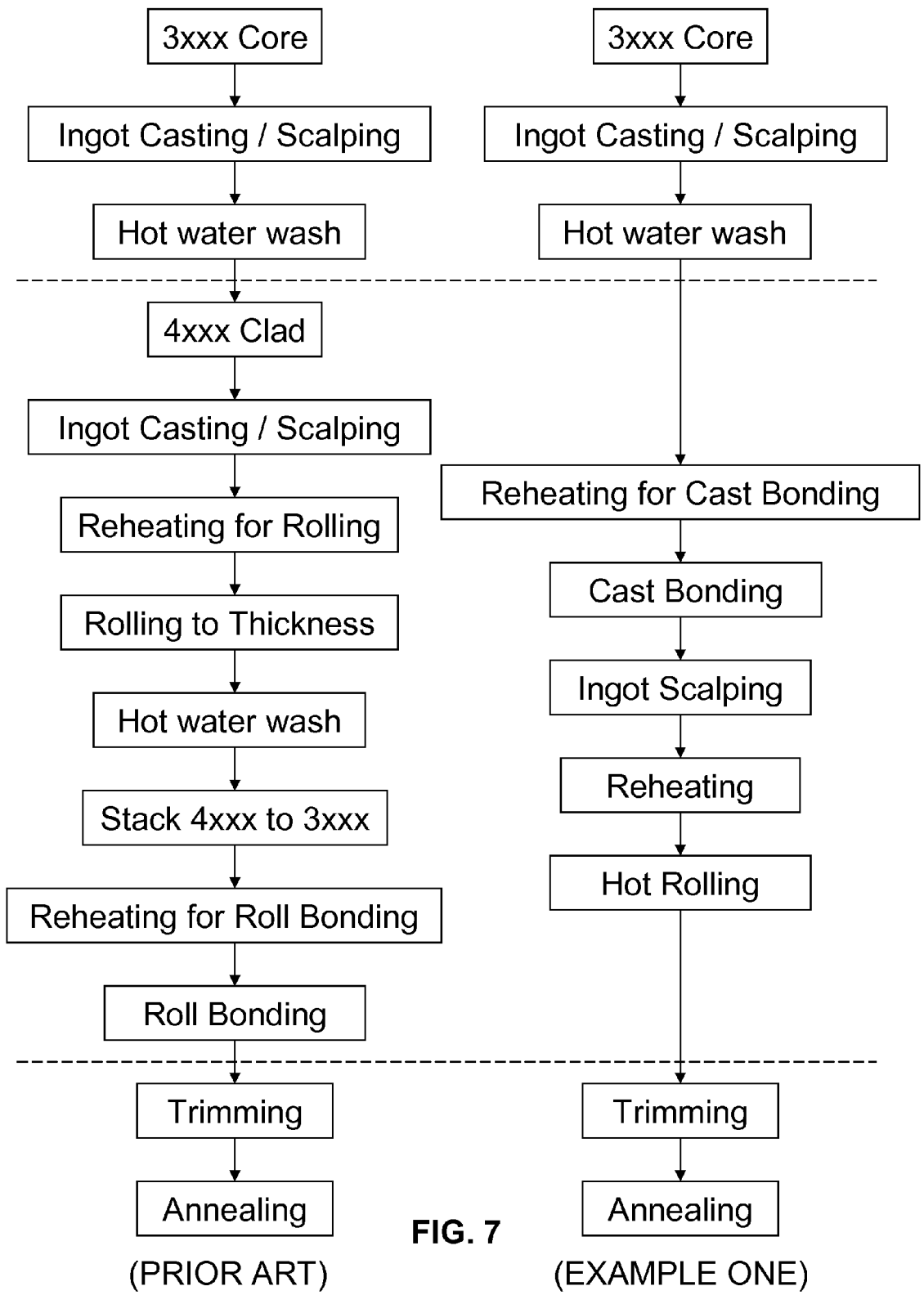
FIG. 7 is a block diagram comparing a conventional roll bonding process to a cast bonding process according to one embodiment of the present disclosure.

FIG. 7 is a block diagram comparing a conventional roll bonding process to a cast bonding process according to one embodiment of the present disclosure. As shown, prior art roll bonding requires the production of a core material by ingot casting followed by scalping with or without homogenization. After scalping the ingot may be hot water washed. The clad material may be produced by a substantially similar process as that of the core material. The clad material and the core material may be stacked against each other and heated for rolling followed by rolling to a thickness. In some embodiments, the rolled thickness may be from about 1 inch to about 6 inches. The clad material is then hot water washed and then stacked to the core material. The coupled multi-layered alloy product is subsequently reheated in preparation for roll bonding and than subjected to the mechanical roll bonding process whereby the core and clad materials are forced into conformance with each other by rollers. The massive deformation may produce a metallurgical bond at the interface between the two aluminum alloys. The resulting product may subsequently be trimmed and annealed.

In contrast, a cast bonding process according to one embodiment of the present disclosure is able to produce a substantially similar multi-layered alloy product with reduced number of steps. Specifically, the cast bonding process calls for placing a second aluminum alloy in contact with a first aluminum alloy. Like the prior art roll bonding process, a core material may be produced by ingot casting followed by scalping with or without homogenization and hot water washed. The core material may subsequently be reheated for the cast bonding process. During the cast bonding step, a clad material may be placed in contact by pouring or spreading onto a surface of the core material. The resulting ingot may then be scalped, reheated and hot rolled. The resulting product may subsequently be trimmed and annealed to produce the substantially similar multi-layered alloy product as that produced by the roll bonding process with a substantially fewer number of steps than the conventional process.

Although the system and method of producing multi-layered aluminum alloy products have been described in detail with reference to several embodiments, additional variations and modifications exist within the scope and spirit as described and defined in the following claims.

We claim:

1. A method comprising:
   producing a first aluminum alloy having a horizontal upper surface;
   heating the first aluminum alloy to a first temperature to form a heated first aluminum alloy, wherein the first temperature is at least about 1° C. lower than the eutectic temperature of the first aluminum alloy;
   producing a liquid second aluminum alloy;
   heating the liquid second aluminum alloy to a second temperature, wherein the second temperature is at least about 5° C. higher than the liquidus temperature of the second aluminum alloy; and
   contacting the liquid second aluminum alloy with the horizontal upper surface of the heated first aluminum alloy thereby producing a first multi-layered aluminum alloy product, wherein the heating the first aluminum alloy step occurs before the contacting step.

2. The method of claim 1, wherein the first temperature is at least about 2° C. lower than the eutectic temperature.

3. The method of claim 1, wherein the first temperature is at least about 3° C. lower than the eutectic temperature.

4. The method of claim 1, wherein the first temperature is at least about 4° C. lower than the eutectic temperature.

5. The method of claim 1, wherein the first temperature is at least about 200° C. lower than the eutectic temperature.

6. The method of claim 1, wherein the first temperature is at least about 300° C. lower than the eutectic temperature.

7. The method of claim 1, wherein the first temperature is at least about 500° C. lower than the eutectic temperature.

\* \* \* \* \*